(12) United States Patent
Heinonen et al.

(10) Patent No.: US 7,123,878 B1
(45) Date of Patent: Oct. 17, 2006

(54) APPARATUS, METHOD AND SYSTEM FOR A CONNECTIVITY TOOL IN BLUETOOTH DEVICES

(75) Inventors: Tomi Heinonen, Tampere (FI); Timo M. Laitinen, Tampere (FI); Tommy Ginman, Espoo (FI); Timo K. Perälä, Helsinki (FI)

(73) Assignee: Nokia Corporation, Espoo (FI)

( * ) Notice: Subject to any disclaimer, the term of this patent is extended or adjusted under 35 U.S.C. 154(b) by 506 days.

(21) Appl. No.: 10/172,516

(22) Filed: Jun. 14, 2002

(51) Int. Cl.
*H04B 7/00* (2006.01)
(52) U.S. Cl. .................. 455/41.2; 455/41.1; 455/41.3; 455/435.1; 705/64; 705/72
(58) Field of Classification Search ............. 455/435.1, 455/41.2, 41.3, 41.1; 705/72, 64
See application file for complete search history.

(56) References Cited

U.S. PATENT DOCUMENTS

| | | | | |
|---|---|---|---|---|
| 5,519,706 | A * | 5/1996 | Bantz et al. | 455/435.2 |
| 6,782,241 | B1 * | 8/2004 | Kobayashi | 455/88 |
| 2002/0075940 | A1 * | 6/2002 | Haartsen | 375/132 |
| 2002/0132584 | A1 * | 9/2002 | Izumi | 455/41 |
| 2002/0177411 | A1 * | 11/2002 | Yajima et al. | 455/41 |
| 2003/0003933 | A1 * | 1/2003 | Deshpande et al. | 455/510 |

\* cited by examiner

*Primary Examiner*—Matthew D. Anderson
*Assistant Examiner*—Sanh Phu
(74) *Attorney, Agent, or Firm*—Morgan & Finnegan, L.L.P.

(57) ABSTRACT

An apparatus, method, and system for a database of Bluetooth devices. The Bluetooth directory database accelerates, facilitates, and simplifies communications. Communications are made more efficient with a connectivity tool. Both the Bluetooth directory database and connectivity tool may be integrated into a Bluetooth device. The connectivity tool uses the Bluetooth directory database to correlate Bluetooth addresses of various devices together with other device identifiers, e.g., cleartextual representations. Thus, when other Bluetooth devices are encountered, information obtained from inquiry and/or page responses may be saved into the Bluetooth directory database for future reference. In one non-limiting example embodiment, communications are more efficient because the connectivity tool reduces the amount of subsequent Bluetooth inquiries and responses required to identify and/or engage in communications with Bluetooth devices. Rather than inquiring to identify and locate Bluetooth devices in a particular coverage area and requiring user selections, the Bluetooth directory database may be used as a cache to retrieve a desired device's communication information (i.e., its correlated Bluetooth address, its functionality (e.g. GOEP, SDAP, etc. profiles), its other related information) and communications may commence more efficiently as a result by directing communications based on the retrieved communication information.

330 Claims, 6 Drawing Sheets

Tinke wants to print a document from his mobile phone at the Bldetooth capable printer.
2. If using normal inquiry/page routines, first Tinke must activate Inquiry. After that a list of discovered BT- devices appears to the display of his phone. Then Tinke must select the device with which he wants to communicate 3. When using inventive BT connectivity tool, Tinke directly enters BTDirectory of his phone and selects the "Timo's desk printer". After that the phone makes inquiries according to BT specifications, but only the inquiry response of the BT printer is displayed and other responses are ignored. Now Tinke's phone can easily start communicating with the BT printer and start printing the document.

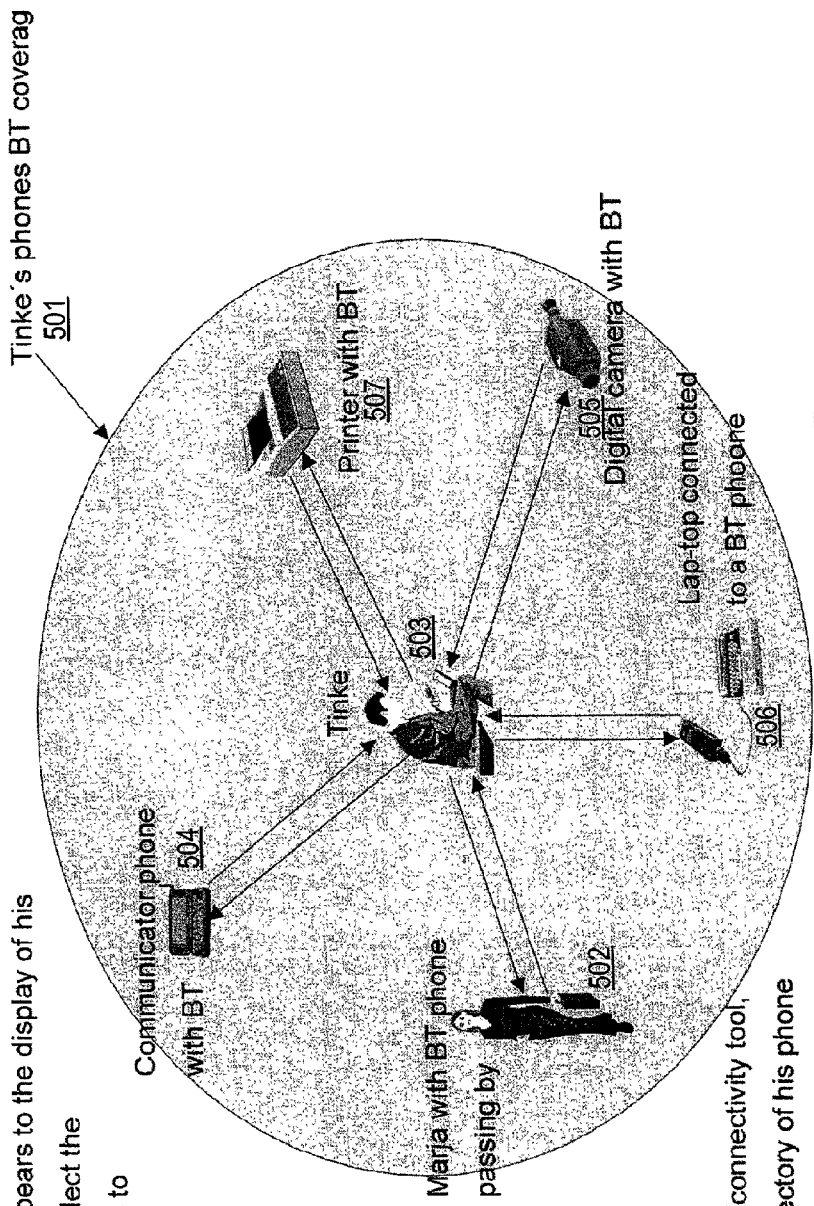

Tinke wants to print a document from his mobile phone at the Bluetooth capable printer.

2. If using normal inquiry/page routines, first Tinke must activate Inquiry. After that a list of discovered BT- devices appears to the display of his phone. Then Tinke must select the device with which he wants to communicate 3. When using inventive BTconnectivity tool, Tinke directly enters BTDirectory of his phone and selects the "Timo's desk printer". After that the phone makes inquiries according to BT specifications, but only the inquiry response of the BT printer is displayed and other responses are ignored. Now Tinke's phone can easily start communicating with the BT printer and start printing the document.

FIGURE 5

*** Also other API's may be built to User's terminal for connecting BTConnectivity tool.
(Example: When a user wants to print some document from his mobile terminal, there might be an API software, which automatically offers user a list of "known" printers and user can choose the right printer depending on where he is located at present.)

APPARATUS, METHOD AND SYSTEM FOR A CONNECTIVITY TOOL IN BLUETOOTH DEVICES

FIELD

The present invention relates generally to an apparatus, method and system to establish and route both communication and information between wireless devices. More particularly, the disclosed invention relates to an apparatus, method and system to enable short-range radio frequency (RF) wireless point-to-point communications to known devices by retrieving information about the known device without subsequent inquiries as between various devices.

BACKGROUND

Information Technology Systems

Typically, users, which may be people or other systems, engage information technology systems (e.g., commonly computers) to facilitate information processing. A computer operating system enables and facilitates users to access and operate computer information technology and resources. Common resources employed in information technology systems include input and output mechanisms through which data may pass, memory storage into which data may be saved, and processors by which information may be processed. Often information technology systems are used to collect data for later retrieval, analysis, and manipulation, which often is facilitated through database software. Information technology systems provide interfaces that allow users to access and operate various system components.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System or Microsoft's Windows provide a baseline and means of accessing and displaying information.

Networks

Networks are commonly thought to consist of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations. There are many forms of networks such as Local Area Networks (LANs), Wide Area Networks (WANs), Pico networks, etc.

Bluetooth (BT) Protocol

Bluetooth is a wireless technology that operates in the unlicensed Industrial, Scientific, and Medical (ISM) radio band of 2.4 GHz. Bluetooth technology includes a number of protocols that allow Bluetooth enabled devices to operate in a peer-to-peer environment forming piconets.

The Bluetooth protocol and specification may be found in: Bluetooth system; Specification Volumes 1 and 2, Core and Profiles: Version 1.1, 22 Feb. 2001.

SUMMARY

One embodiment of the present invention solves the problem of allowing short-range radio frequency (RF) wireless communications enabled devices, such as for example Bluetooth enabled devices, to remember information about other Bluetooth devices wherein there has been previous communications between the devices. Such an ability is useful and more efficient than previous offerings because it allows communications to commence between devices without requiring an initiating device to make repeated communication device inquiries. Further, such abilities reduce communication times by lowering and/or eliminating device-to-device negotiations to establish communication connections.

One non-limiting example embodiment taught by the instant disclosure is an apparatus, method, and system for a database that correlates Bluetooth devices. The Bluetooth directory database can be stored on Bluetooth devices. The Bluetooth directory database accelerates, facilitates, and simplifies communications. Communications are made more efficient by using and correlating Bluetooth addresses of various devices together with other device identifiers, e.g., clear textual representations (cleartext), in the Bluetooth directory database within a device.

In one non-limiting example embodiment of the the disclosure teaches an apparatus for wireless communication between Bluetooth devices. The apparatus is comprised of: a memory, where the memory is used for storing instructions; and a processor that may issue a plurality of processing instructions stored in the memory. The instructions issue signals to: invoke a selection list of known devices; retrieve known devices from a device descriptive database; provide the selection list of known devices, wherein items in the selection list of known devices may be selected, wherein the list of known devices is populated with known devices retrieved from the device descriptive database; accept a selection of a representation of a desired target device from the list; and send a signal to establish a communication connection with the desired target device, wherein the sent establishing signal may effect a response from the desired target device.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain non-limiting example embodiments of the disclosure.

FIG. 5 illustrates a block diagram of one non-limiting example embodiment showing connectivity tool interaction;

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Bluetooth Enabled Client Terminal Device

Figure 1:
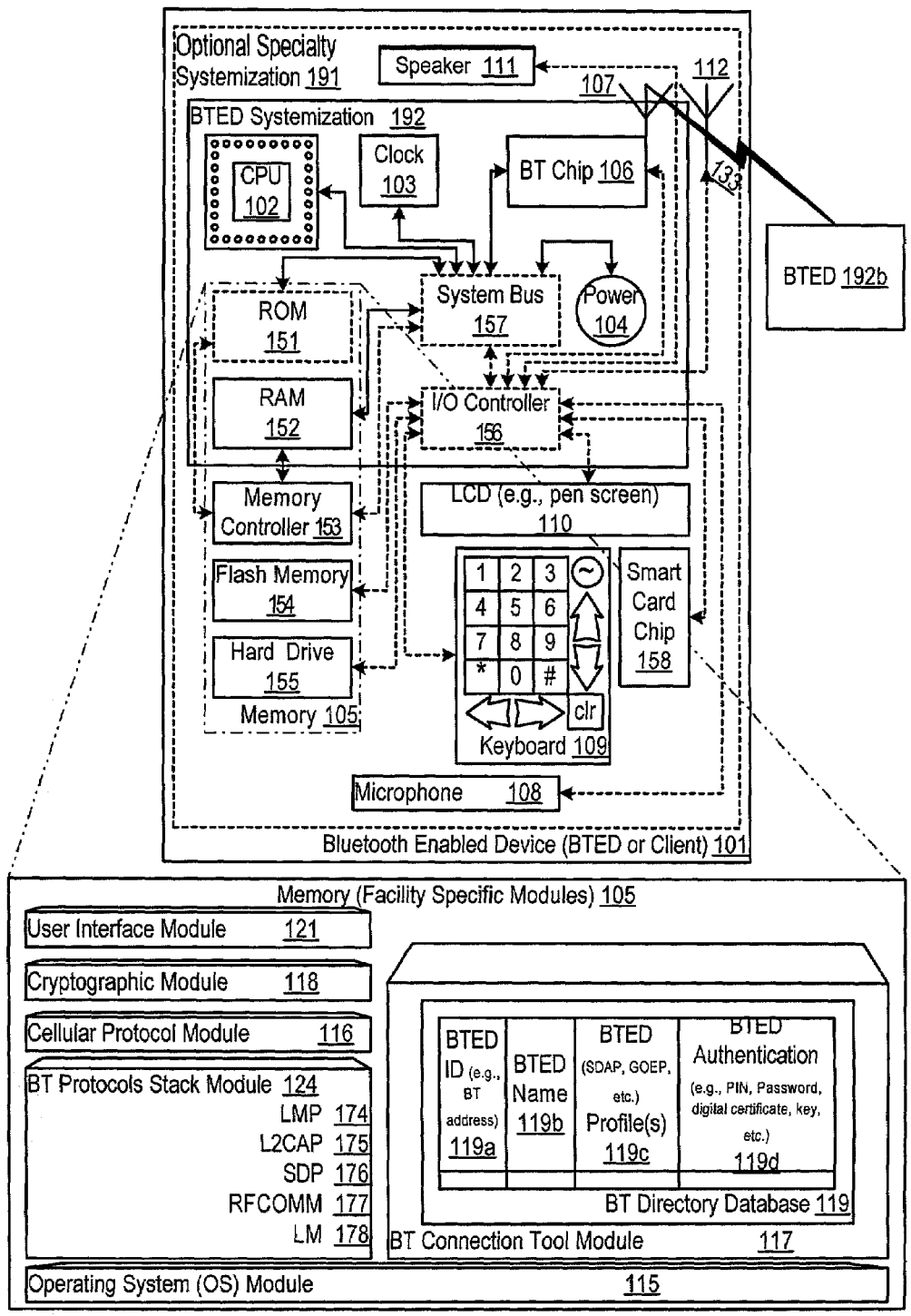
FIG. 1 illustrates a schematic overview of one non-limiting example embodiment of a Bluetooth enabled device 101.

FIG. 1 illustrates a schematic overview of one non-limiting example embodiment of a short-range, radio frequency (RF), Bluetooth enabled, client-terminal device ("client" or "Bluetooth device") 101. The Bluetooth enabled device 101 is comprised of a Bluetooth enabled device systemization 192 and optionally with a specialty systemization 191. Optional items are marked by dotted lines, while dash-dot lines show greater detail within the item. The Bluetooth enabled device systemization 192 may be comprised of a: clock 103, central processing unit (CPU) 102, a memory 105, a power source 104, a Bluetooth chip 106 and transceiver 107. Optionally the Bluetooth enabled device systemization 192 may further be comprised of a system bus 152 and input and output (I/O) controller 156.

The optional specialty systemization 191 may be comprised of a: various extended forms 151, 153, 154, 155 of memory 105, input 108, 109, 110, output 110, 111, communication 112, 158, and Bluetooth enabled device systemization 192 components. Regardless of any actual configuration, as long as a client is enabled with a Bluetooth enabled device systemization 192 and a Bluetooth connectivity tool 117, which will be discussed in greater detail below, then the client 101 may accelerate and simplify Bluetooth protocol communications when communicating with other Bluetooth enabled devices.

Bluetooth Component Detail

Conventionally, although not necessarily, the client components are all interconnected and/or communicating through a system bus 157. In one non-limiting example embodiment of the Bluetooth enabled device systemization 192, the system bus 157 is communicatively and electrically interconnected, i.e., connected, with the CPU 102, clock 103, Bluetooth chip 106, power source 104, and memory 105. In an alternative embodiment an I/O controller 156 may be similarly connected into the system bus 157 and the Bluetooth chip 106 is connected into the I/O controller 156 instead of the system bus.

The power source 104 provides power to the client 101. The system clock 103 typically has a crystal oscillator and provides a base signal. The clock is typically coupled to the system bus and various means that will increase or decrease the base operating frequency for other components interconnected in the client. The clock and various components in the client drive signals embodying information throughout the client. Such transmission and reception of signals embodying information throughout the client may be commonly referred to as communications. These communicative signals may further be transmitted, received, and the cause of return and/or reply signal communications beyond the instant client to: communications networks, input devices, computer systems (e.g., servers), bridges, other clients, peripheral devices, repeaters, and/or the like.

Any of the client components may be connected directly to one another, connected to the CPU, and/or organized in numerous variations; examples of such variations may be found in various wireless and short range RF enabled devices (without a Bluetooth connectivity tool) such as, but not limited to: cellular telephones, Portable Digital Assistants (PDAs), laptop computers, peripheral devices, and/or the like. Optionally, the client may include various input/output devices, which are also disposed in communication with the CPU through the system bus and/or directly. Such input devices may include a microphone 108, an input keypad 109, a touch sensitive screen 110, and/or like. Output devices may include a (liquid crystal) display (LCD) 110, a speaker 111, a CRT (not shown), a printing element (not shown), and/or the like.

One of the I/O components is a Bluetooth chip 106 such as Cambridge Silicon Radio Inc.'s BlueCore IC and Bluetooth transceiver 107 capable of transmitting and receiving Bluetooth protocol communications (Bluetooth transceiver), wherein the Bluetooth transceiver 107 is connected to the Bluetooth chip 106. It is to be understood that the use of Bluetooth components/protocols in the exemplary embodiment is intended to be illustrative rather than limiting. Optionally, the client may also employ other wireless protocol transceivers 112 such as those employed for cellular telecommunications. Furthermore, a smartcard chip 158 may be employed to allow for unique identification of the client and may be used to enhance commercial transactions. The smartcard chip 158 may be provided by a number of smartcard providers in a single integrated circuit or component based format such as, but not limited to Gemplus SA's line of products (e.g., Chipware microcontroller integrated circuit, GemClub Micro, GemXpresso 211/V2, and/or the like).

CPU

The CPU 102 comprises at least one data processor adequate to execute program modules for executing user and/or system-generated requests. The CPU may be a microprocessor such as ARM's StrongARM, Intel's Pentium, Motorola's Dragonball, and/or the like. The CPU interacts with memory through signal passing through electrically connected, conductive conduits to execute stored program instruction signals according to conventional data processing techniques. Such signal passing facilitates communication within the communication networks and beyond through various interfaces.

Memory

It is to be understood that the client may employ various forms of memory 105. In a typical Bluetooth enabled device systemization 192 configuration, memory 105 may include random access memory (RAM) 152 and optionally read only memory (ROM) 151. Optional specialty systemizations 191 may include any number of memory formats such as, but not limited to: flash memory 154, fixed storage devices, e.g., a hard disk drive 155, and/or the like. In one non-limiting example embodiment, the various system memory formats 151, 152 are connected to a memory controller 153 instead of to the system bus 157, and the memory controller is connected to the system bus 157. In another example embodiment, various peripheral memory formats 154, 155 are connected to an I/O controller 156 instead of to the system bus 157, and the I/O controller is connected to the system bus 157.

Also, the Bluetooth chip 106 may contain various Bluetooth protocols within its own memory that may be provided to either the CPU 102 and/or memory 105; similarly, the smartcard chip 158 may also provide its own memory. Generally, any mechanization and/or embodiment allowing a processor to affect the storage and/or retrieval of information is regarded as memory 105. Thus, a client 101 generally requires and makes use of memory. However, memory is a fungible technology and resource, thus, any number of memory embodiments may be employed in lieu of or in concert with one another.

Module Collection

The memory 105 may contain a collection of program modules and/or data such as, but not limited to: an operating system 115; Bluetooth communication protocol including a Bluetooth protocol stack 124; cellular communication protocols (if any) 116; cryptographic module 118, user interface 121; Bluetooth connectivity tool 117; Bluetooth directory database 119; and other short range radio frequency protocols (if any); and/or the like. Program modules are simply stored and/or fixed instruction signals, which when passed through a CPU 102 are executed. Similarly, data signals are also stored and/or fixed signals representing various data sets, which may be passed through client 101 components for processing and/or execution. It is understood that throughout this disclosure that instruction signals also encompass data signals. Software modules such as those in the module collection, typically and preferably, are stored in memory 105, they may also be loaded and/or stored in memory such as: peripheral devices, ROM, remote storage facilities through a communications network, various forms of memory, and/or the like.

Operating System

The operating system 115 is comprised of stored instruction signals executable by the CPU that facilitates the operation of the client. Typically, the operating system facilitates access of I/O, network interfaces, peripheral devices, storage devices, and/or the like. The operating system also may provide user interface functionality allowing the user to interact with the client. Example client operating systems include: Java based environments, Linux, Microsoft Pocket PC, Palm OS, various proprietary cell phone operating systems, and/or the like. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the client to communicate with other entities through a communications network. Various communication protocols may be used by the client as a subcarrier transport mechanism for interacting with other short range RF enabled devices, such as, but not limited to: mobile network protocols (e.g., Enhanced Messaging Service (EMS), Multimedia Message Service (MMS), Short Message Service (SMS), and/or the like), Bluetooth (e.g., via RFCOMM), OBEX, TCP/IP and/or the like. However, only Bluetooth protocol is required to work in conjunction with a Bluetooth connectivity tool.

Bluetooth Protocols

In memory 105 various Bluetooth protocols 124 and/or other short range RF protocols are stored. The Bluetooth protocol stack 124 may include a link management protocol (LMP) 174, a logical link control and application protocol (L2CAP) 175, a service discovery protocol (SDP) 176, RFCOMM 177 (i.e., a serial line emulation protocol), link manager (LM) 178, and/or the like. The LM 178 runs on the CPU in the client to manage communications between itself and other Bluetooth devices via LMP 174, and/or the like. After the connection of a Bluetooth client with another device, SDP enables the querying and identification of the abilities of other Bluetooth devices. L2CAP provides multiplexing, packet segmentation and reassembly of data as it is communicated between the client and other Bluetooth enabled devices. Another protocol held in memory 105 is the RFCOMM, which is a serial line emulation protocol that enables Bluetooth devices to intercommunicate by emulating a serial line. These various protocols interact to encode and decode data as given by the CPU through a base band 107. LMP and L2CAP run directly on top of base band 107. RFCOMM and SDP run on top of L2CAP. It should be understood that the above is only one example and Bluetooth device configuration. Configurations will vary in detail and implementation, however, as long as any given configuration employs a Bluetooth protocol, its performance may be enhanced with a Bluetooth connectivity tool.

Cellular Protocols

In memory 105 various optional cellular protocols 116 protocols may be stored. A single or multiple known protocols may be included and enabled with the appropriate cellular transceiver(s) 112 such as, but not limited to: base station controller to base transceiver station (BTSM), code division multiple access (CDMA), general packet radio service (GPRS), global system for mobile telecommunications (GSM), and/or the like.

Cryptographic Server

A cryptographic module 118 is stored instruction signals that is executed by the CPU 103, a cryptographic processor, and/or the like. Preferably, cryptographic processor interfaces will allow for expedition of encryption and/or decryption requests by the cryptographic module; however, the cryptographic module, alternatively, may run on a conventional CPU. Preferably, the cryptographic module allows for the encryption and/or decryption of provided data. Preferably, the cryptographic module allows for both symmetric and asymmetric (e.g., Pretty Good Protection (PGP)) encryption and/or decryption. Preferably, the cryptographic module allows conventional cryptographic techniques such as, but not limited to: digital certificates (e.g., X.509 authentication framework), digital signatures, dual signatures, enveloping, password access protection, public key management, and/or the like. Preferably, the cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, RC5 (Rivest Cipher), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource. A cryptographic module may communicate to and/or with other modules in a module collection, including itself, and/or facilities of the like. Preferably, the cryptographic module supports encryption schemes allowing for the secure transmission of information across a communications network to enable a client 101 to engage in secure transactions if so desired by users. The cryptographic module facilitates the secure accessing of resources on a client and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses. In one non-limiting example embodiment, such a cryptographic tool may be provided as a library within the operating system accessible to all other modules in a module collection through an application program interface (API). The cryptographic tool enables local processing of authentication information 119*d*.

User Interface

A user interface module 121 is comprised of stored instruction signals that may be executed by the CPU. The user interface may be a conventional graphic user interface as provided by, with, and/or atop operating systems and/or operating environments such as Apple Macintosh OS, e.g., Aqua, Microsoft Windows (CE), Palm OS, proprietary cellular telephone interfaces, textual (e.g., command line) interfaces, Unix X Windows (KDE, Gnome, and/or the like), and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Bluetooth Connectivity Tool

Furthermore, within the memory 105 is a Bluetooth connectivity tool (connectivity tool) 117. The connectivity tool is responsible for storing information obtained from other Bluetooth enabled devices encountered by the client 101. In one non-limiting example embodiment, the connectivity tool comprises and/or employs a device adding facility (which will be described in greater detail in FIG. 6) and a device selection facility (which will be described in greater detail in FIGS. 7 and 8). The connectivity tool interacts with the Bluetooth directory database 119 by saving information received from Bluetooth devices responding to an inquiry and/or page message from the client 101. The type of information extracted and/or saved from such responses is described in greater detail below 119*a–d*. Upon having stored information about a device, the connectivity tool allows a user to create a communication connection with a specific device while ignoring other Bluetooth devices within its coverage area and/or without requiring an inquiry/response negotiation. The connectivity tool may communicate to and/or with other modules in a module collection, including itself, and/or facilities of the like. The connectivity tool communicates with other program modules, user interfaces, and/or the like. For example, the connectivity tool may contain, communicate, generate, obtain, and/or provide program module, system, user, and/or data communications, requests, and/or responses. The connectivity tool, once executed by the CPU, may enable the interaction with communications networks, data, I/O, peripheral devices, program modules, memory, user input devices, and/or the like. The connectivity tool may employ the operating system or itself enable and/or provide protocols that allow the client to communicate with other entities through a communications network such as Bluetooth piconet.

Bluetooth Directory Database

A Bluetooth directory database (BTDDB) 119 may be embodied in a database and its stored data, wherein the database comprises stored instruction signals, which may be executed by the CPU to store and retrieve data; the stored instruction signal portion configuring the CPU to process the stored data. Ideally the database is a conventional, fault tolerant, relational, scalable, secure database such as HanDBase, Oracle (e.g., 8iLite Optimized Object-Relational database), thinkDB, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively and/or in environments where processing power and memory are limited, the Bluetooth directory database may be implemented using various standard data-structures, such as an array, hash, (linked) list, struct, table, and/or the like. Such data-structures may be stored in memory and/or in (structured) files. If the Bluetooth directory database is implemented as a data-structure, the use of the Bluetooth directory database database may be integrated into another module such as the Bluetooth connectivity tool 117. Databases may be consolidated and/or distributed in countless variations through standard data processing techniques. Portions of databases, e.g., tables, may be exported and/or imported and thus decentralized and/or integrated. In one non-limiting example embodiment, the database module 119 includes tables such as but not limited to a Bluetooth: identifier (e.g., a Bluetooth address) table 119a, name (e.g., a cleartext name to represent a Bluetooth enabled device) table 119b, profile(s) (e.g., generic object exchange profile (GOEP), service discovery application profile (SDAP) compliant profiles, etc.) table 119c, authentication (e.g., personal identification number (PIN), password, digital certificate, encryption key, etc.) table 119d, and/or the like. All the tables may be related by the Bluetooth identifier 119a key field entries as they are unique. In an alternative embodiment, these tables may be decentralized into their own databases and their respective database controllers (i.e., individual database for each of the above tables may exist). By employing standard data processing techniques, one may further distribute the databases over several Bluetooth enabled device systemizations and/or storage devices. Similarly, configurations of the decentralized database controllers may be varied by consolidating and/or distributing the various database modules 119a–d. The Bluetooth directory database may be configured to keep track of other Bluetooth enabled devices that have passed within the range of the client 101 as well as user requests, and/or other various transactions.

A Bluetooth directory database may communicate to and/or with other modules in a module collection, including itself, and/or facilities of the like. Most frequently, the Bluetooth directory database communicates with a Bluetooth connectivity tool 117, other program modules, and/or the like. The database may contain, retain, and provide information regarding other Bluetooth devices and data.

In an alternative embodiment, a Bluetooth identifier field 119a is added to a normal contact database (e.g., such as those found in cellular telephones, PDAs, and/or the like) and linked to a Bluetooth directory database. Such an embodiment is discussed further in FIG. 6.

Module Collection Configuration

The functionality of any of the client components and/or functionalities may be combined, consolidated, and/or distributed in any number of ways to facilitate development and/or deployment. Similarly, the module collection may be combined in any number of ways to facilitate deployment and/or development. To accomplish this, one must simply integrate the components into a common component base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single client, and/or across numerous clients to improve performance through load balancing data processing techniques. Furthermore, single instances may also be distributed across multiple controllers and/or storage devices; e.g., databases.

All program module instances and clients working in concert may do so through standard data processing communication techniques.

The preferred client configuration will depend on the context of system deployment. Factors such as, but not limited to, the capacity, cost, location, and/or purpose of the underlying hardware resources may affect deployment requirements and configuration. For example, a printer enabled with the Bluetooth connectivity tool will have a different set of requirements than a laptop enabled with the Bluetooth connectivity tool. Regardless of if the configuration results in more consolidated and/or integrated modules, results in a more distributed series of modules, and/or results in some combination between a consolidated and/or distributed configuration, communication of data may be communicated, obtained, and/or provided. Instances of modules (from the module collection) consolidated into a common component base from the program module collection may communicate, obtain, and/or provide data. This may be accomplished through standard data processing techniques such as, but not limited to: data referencing (e.g., pointers), internal messaging, object instance variable communication, shared memory space, variable passing, and/or the like (intra-application communication).

If module collection components are discrete, separate, and/or external to one another, then communicating, obtaining, and/or providing data with and/or to other module components may be accomplished through standard data processing techniques such as, but not limited to: API information passage; (distributed) component object model ((D)COM), (distributed) object linking and embedding ((D)OLE), and/or the like), common object request broker architecture (CORBA), process pipes, shared files, and/or the like (inter-application communication). Messages sent between discrete module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the preferable embodiment will depend upon the context of system deployment.

Also, it is to be understood that the logical and/or topological structure of any combination of the module collection and/or the present invention as described in the figures and throughout are not limited to a fixed execution order and/or arrangement, but rather, any disclosed order is exemplary and all functional equivalents, regardless of order, are contemplated by the disclosure. Furthermore, it is to be understood that such structures are not limited to serial execution, but rather, any number of threads, processes, services, servers, and/or the like that may execute asynchronously, simultaneously, synchronously, and/or the like are contemplated by the disclosure.

In one non-limiting example embodiment, the cryptographic module 118 and Bluetooth protocol stack 124 are integrated into the operating system 115.

Bluetooth Device Communication

FIG. 1 further illustrates that the client 101 may communicate wirelessly 133 via Bluetooth protocol with another client 192b.

Bluetooth Device Range

Bluetooth Device Out of Range

Figure 2:
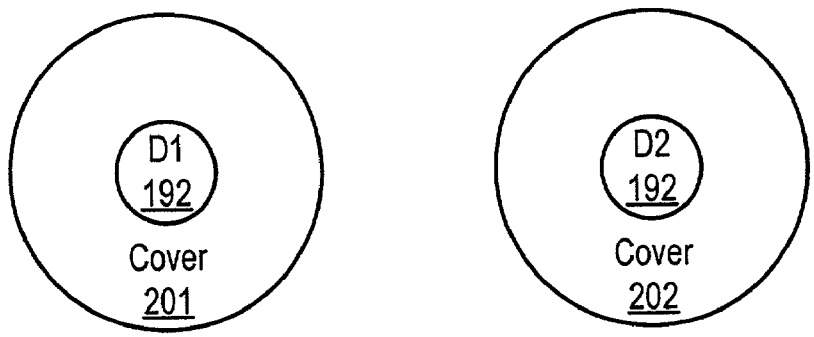
FIG. 2 is a block diagram of two out of range Bluetooth transceiver enabled devices.

FIG. 2 is a block diagram of two Bluetooth transceiver enabled devices 192 D1 and D2. The effective coverage area 201, 202 offered by a given Bluetooth enabled device (e.g., D1 or D2) will vary based on the signal strength of the Bluetooth transceiver of in a given device. For example, a typical Bluetooth device has a radial range of approximately 10 meters, however, with a 10 milliwatt transceiver the effective radial coverage area may be extended to approximately 100 meters. In other embodiments, various antenna constructs may focus and/or reshape the coverage area into a non-radial geometry.

Thus, FIG. 2 illustrates a scenario when D1 and D2 are outside each other's coverage areas. In such a scenario, no communications may take place between D1 and D2.

For communications to take place between D1 and D2, the coverage area 201 of D1 (originating device) must reach and/or overlap the transceiver and/or its antenna within D2 (recipient device) for sending communications from D1 to D2, and in turn, the coverage area 202 of D2 must reach and/or overlap the transceiver within D1 to receive communications at D1 from D2.

Bluetooth Devices In and Out of Range

Figure 3:
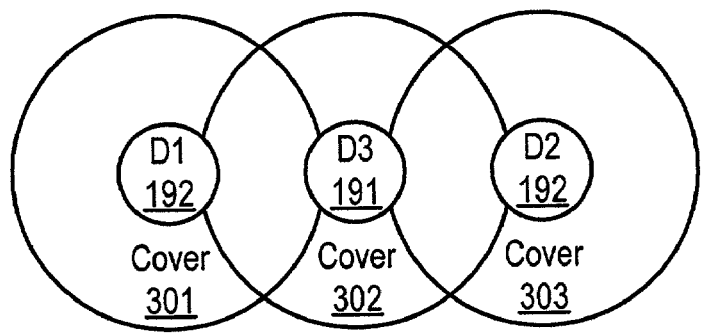
FIG. 3 is a block diagram of three Bluetooth transceiver enabled devices that are both inside and outside each other's coverage areas.

FIG. 3 is a block diagram of three Bluetooth transceiver enabled devices, D1 and D2 that are outside each other's coverage areas 301, 303, and device D3 191 that is in range of both D1 and D2 through D3's coverage area 302. Thus, in such a scenario devices D1 and D2 could not directly communicate with one another, while device D3 could communicate with each of the other devices.

Bluetooth Devices in Range

Figure 4:
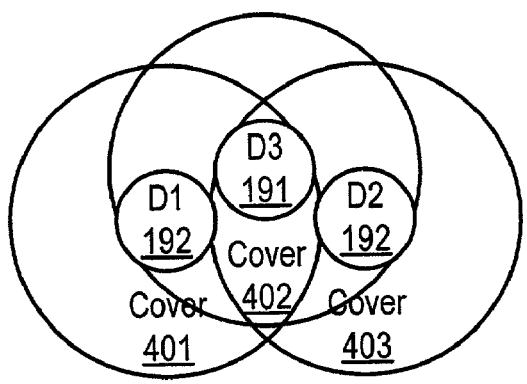
FIG. 4 is a block diagram of three Bluetooth transceiver enabled devices that are inside each other's coverage areas.

FIG. 4 is a block diagram of three of three Bluetooth transceiver enabled devices D1, D2, and D3 that are all within each other's coverage areas 401, 403, 402. Thus, in such a scenario each of the devices D1, D2, and D3 could directly communicate with one another.

As clients 101 come in and out of range of one another, the Bluetooth connectivity tool on each of the devices stores information obtained through the standard Bluetooth protocol negotiations, i.e., information obtained through inquiry and inquiry responses as well as subsequent page and page responses. Information obtained through Bluetooth negotiation responses may be stored in the Bluetooth directory database including the Bluetooth address, name, profile, authentication, and/or the like information received from responding Bluetooth devices.

Connectivity Tool Interaction

FIG. 5 illustrates a block diagram of one non-limiting example embodiment showing connectivity tool interaction. In this example, the connectivity tool 503 is integrated into Bluetooth enabled device 101, namely a telephone. The Bluetooth enabled device with the connectivity tool has an effective Bluetooth range as illustrated by a circle 501 surrounding the connectivity tool 503. The block diagram further illustrates that various Bluetooth enabled devices are circumscribed by the connectivity tool's area coverage 501. In this non-limiting example, various Bluetooth enabled devices are circumscribed within the connectivity tool's coverage area 501, namely, a communicator phone 504, a printer 507, a digital camera 505, laptop connected to Bluetooth phone 506, and a pedestrian passing by with a Bluetooth enabled phone 502.

Without the Bluetooth connectivity tool 503 integrated into the Bluetooth enabled device 503, normally Bluetooth inquiry and page routines would be required to recognize any other Bluetooth devices located within the Bluetooth enabled device's 503 coverage area 501. Thus, without the Bluetooth connectivity tool being integrated into the Bluetooth enabled device 503, the Bluetooth enabled device 503 would require the activation of an inquiry to discern what other Bluetooth enabled devices were available before it 503 could communicate with any such devices. Upon inquiry activation, inquiry responses would be received by the Bluetooth enabled device 503 from any other Bluetooth devices within the Bluetooth enabled device's 503 coverage area 501. Upon receiving the inquiry responses, the Bluetooth enabled device 503 could display all discovered devices. At this point the user 503 would have to select from an item in the list to page the selected item.

However, with the addition of the connectivity tool 117, the user may directly retrieve a list of known Bluetooth devices from a Bluetooth directory database on the client 503, in this case a phone, and select a desired target Bluetooth device with which to communicate without having to first activate an inquiry. In one non-limiting example embodiment, upon selecting a desired target Bluetooth device from the connectivity tool, the connectivity tool then makes an inquiry according to Bluetooth specifications. In such an example, the connectivity tool will receive an inquiry response from the desired target Bluetooth enabled device and all other inquiry responses from any other Bluetooth devices are ignored. In an alternative embodiment, upon selecting a desired target Bluetooth device, the connectivity tool then sends a page directed to the desired target device.

An example illustrating the benefits of the connectivity tool is useful to show the great productivity and ease of use gains. Normally if the user 503 wished to print to a known printer 507 a lot of communication negotiations would take place to establish a connection. In the normal case without a connectivity tool, the user 503 would have to activate an inquiry command on the client 503. Then inquiry responses would flood the user's client from all other devices 502, 504, 505, 506, 507 in the coverage area 501. Then the user would have to select the desired device, e.g., the printer 507, from the list. Thereafter, the user's client would finally send a page to the printer 507 and establish a connection. With the connectivity tool the user simply activate a selection facility of known devices and selects the printer 507. Thereafter, the client may directly page the printer 507 or issue an inquiry and display and/or make a page connection to an inquiry response from the printer 507 while ignoring all other inquiry responses. The Bluetooth connectivity tool's ability to focus will provide larger and larger productivity gains as the number of Bluetooth devices increase. One non-limiting aspect of the Bluetooth connectivity tool solves the problem of being inundated with too many responses from surrounding Bluetooth devices.

Connectivity Tool Device Addition Facility

Figure 6:
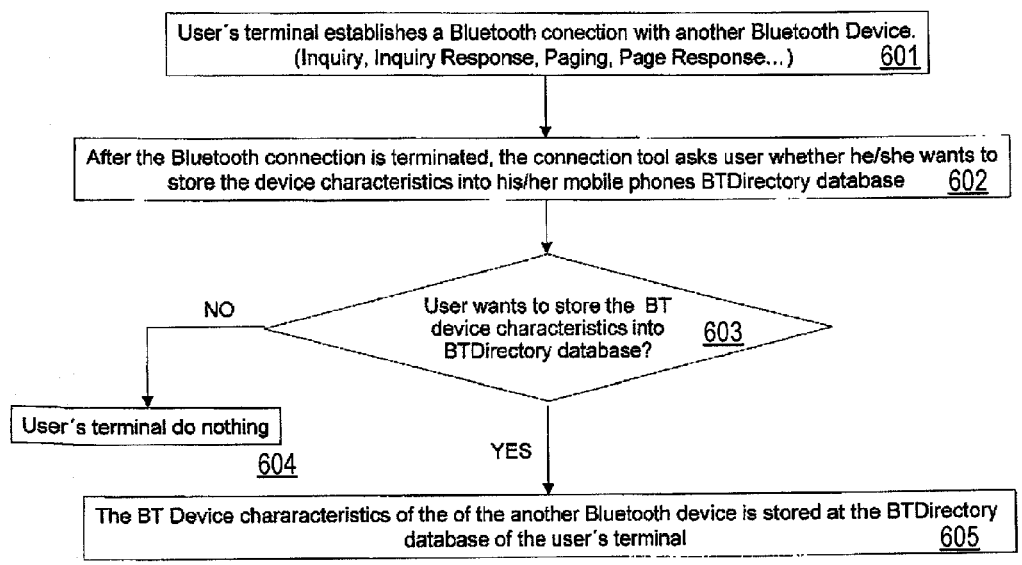
FIG. 6 illustrates a flowchart of one non-limiting example embodiment of a connectivity tool device-addition facility.

FIG. 6 illustrates a flowchart of one non-limiting example embodiment of a connectivity tool device-addition facility, i.e., addition facility. An additional facility is provided as a mechanism to allow a user to store information about desired target devices. Upon establishing a connection between a user's Bluetooth enabled device (via an addition facility connectivity tool) and another, i.e., target, Bluetooth enabled device, then information about the other Bluetooth enabled device becomes available to the user's Bluetooth enabled device 601. Information from the target Bluetooth device may be obtained through various standard Bluetooth information exchange protocols, such as but not limited to: service discovery protocol with service discovery application profiles; generic object exchange profile; and/or like. Such information exchanges may occur in an initial page response from a target Bluetooth device, which was paged by the user's client 101; the client was able to page the target device having identified the target device from an inquiry response to an initial inquiry from the client, i.e., a standard Bluetooth communication connection negotiation.

Upon establishing a connection with another Bluetooth device 601, the addition facility may be invoked upon the termination of the connection 602. In one non-limiting example embodiment, upon engaging a mechanism to terminate the Bluetooth connection with the target Bluetooth device, the addition facility is automatically invoked. The connectivity tool, through the invocation of the addition facility, may prompt the user to store or discard discerned device characteristics from the target Bluetooth device.

Upon the addition facility's prompting the user 602, a decision may be reached as to whether or not to store the discerned device characteristics into a Bluetooth directory database 603. If there is a negative indication, then the user's Bluetooth device 101 will not store the discerned device characteristics 604. If there is a positive indication 603, then the user's Bluetooth device will store the discerned device characteristics in a Bluetooth directory database 605. In one example embodiment, a positive or negative indication may be provided by the user engaging the user input facility, e.g., keyboard, keypad 109, touchscreen 110, and/or the like, to make a selection. For example, the user may engage a key (e.g., "1" or "2") on the keypad in response to a prompt (e.g., "press '1' to add or '2' to discard the following Bluetooth device) on a display as an indication. In an alternative embodiment, either a positive or negative indication may automatically be provided as a default without further interaction from the user. In one non-limiting example embodiment, all Bluetooth enabled devices that have been discerned and/or identified by the client are automatically added to the Bluetooth directory database; in such an example, as memory becomes more scarce the connectivity tool may purge un-needed information regarding known devices by employing any number of techniques, such as, but not limited to removing the oldest entries, prompting the user to remove an entry, removing the least frequently encountered and/or engaged entry, and/or the like.

In an alternative embodiment, as memory on the client becomes scarce, known device sets (KDS) may be created and/or accessed. A KDS is a set of Bluetooth addresses (i.e., BD_ADDRs) of known devices. Sets of known devices may be saved to a remotely (e.g., on a network accessible storage device) to free client memory resources. In such an embodiment, rather than saving KDSs on the client device, an address for a KDS on a remote storage device is saved on the client, instead. In an alternative embodiment, when there is sufficient memory on the client device, the KDS itself is also stored on the client device and synchronized with the remotely stored KDS; this provides a client device KDS cache for increased network performance. As current Bluetooth enabled mobile phones have very limited memory resources, the ability to store a reference to a known set of devices is advantageous for maximizing memory usage and enhancing the user experience with device sets tailored to user frequented locations.

The known device sets may be location based. KDSs may be retrieved from the user's current location into their client device. Thus, in memory limited situations, the client device's current KDS may be purged from memory to make room for the retrieval of a KDS from a new location. In an alternative embodiment, when sufficient memory exists, the current KDS is not purged, but a KDS retrieved from a new location takes priority while the user is in the new location. As such, when when a user is at home, she could access a KDS through a local connection and storage device (e.g., via home Bluetooth access point, and/or the like), through mobile network (e.g., EMS, SMS, MMS, and/or the like), and/or the like. When accessing a KDS from the "home" location, the user's client device will be made aware of Bluetooth appliances/devices that are accessible from their home location. Further, when the user goes to her workplace, a KDS may be fetched from their workplace network. Such sets would be highly tailored to each of the user's environments, thereby, both reducing uneccessary client device communications and increasing user productivity with known devices relevant to their situation.

Connectivity Tool Device Selection Facility

Figure 7:
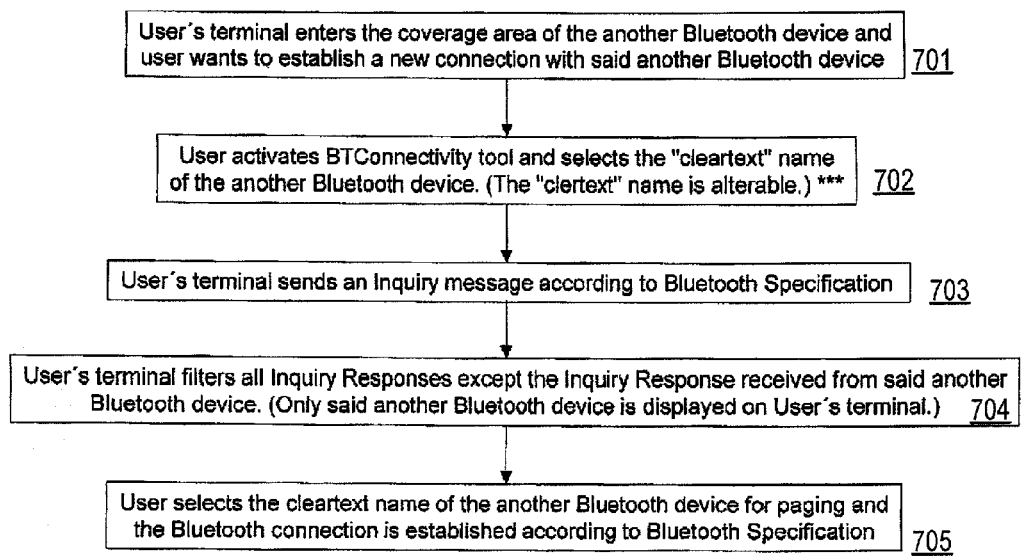
FIG. 7 illustrates a flowchart diagram of one non-limiting example embodiment of a connectivity tool device-selection-facility.

FIG. 7 illustrates a flowchart diagram of one non-limiting example embodiment of a connectivity tool device-selection-facility, i.e., selection facility. The selection facility may be engaged to establish a new communication connection with another Bluetooth device that is within range 701.

When in range 701, a client's 101 Bluetooth connectivity tool may be engaged, and in turn the selection facility may be provided to the user 702. In one non-limiting example embodiment, the connectivity tool may be engaged through a user input facility; for example, by depressing a key combination on a key pad like "##1". Alternatively, the connectivity tool may be engaged whenever new Bluetooth devices are detected within range. In one non-limiting example embodiment, the selection facility is automatically engaged upon activation of the Bluetooth connectivity tool. Upon activating the selection facility, a list is generated by retrieving entries of Bluetooth enabled devices found within the Bluetooth directory database. Such a list may be created by querying the Bluetooth directory database to select all unique Bluetooth identifiers 119a and return corresponding Bluetooth names 119b, wherein the Bluetooth names 119b are then fed to a user interface for user display by the selection facility. Upon generating the list of known Bluetooth enabled devices, the selection facility displays the list and allows a user to select entries corresponding to known Bluetooth devices by engaging the client's user interface.

In one non-limiting example embodiment, such a list comprises cleartext names, which represent other known Bluetooth devices and are associated with the Bluetooth addresses of the known devices. For example, a Nokia cell phone may have a Bluetooth clear-text name of "Jane Smith's Nokia cell phone," which is associated with the Nokia cell phone's Bluetooth address" as part of the Nokia phone's SDAP information. Such an association between known Bluetooth devices and their cleartext names may be maintained within the connectivity tool's Bluetooth directory database. In an alternative embodiment, a cleartext name is alterable by the user. Alteration may be achieved by providing and allowing a user to edit Bluetooth name 119b information in the Bluetooth directory database. In an alternative embodiment, editing the Bluetooth name 119b is facilitated by user editing tools in a contact-database linked to a Bluetooth directory database.

Upon displaying the list of known devices, the selection facility allows for the selection of the target Bluetooth device 702. In one non-limiting example embodiment, the user may navigate a cleartext selection list and select a desired target Bluetooth device by engaging the user input device, e.g., by depressing a scroll buttons on a keypad 109, which thereby allows for list traversal and selection of a desired device by highlighting its cleartext representation. It should be noted that the selection facility may be accessed through an API; therefore, applications may make use of the selection facility through an API, which in turn engages the selection facility as a system resource. An API would allow any particular application to further narrow items for display via the selection facility. For example, if the selection facility were invoked via an application's printing API, instead of displaying a list of all known Bluetooth devices, then the API may instruct the selection facility to display only known Bluetooth printer devices. Such filtering functionality greatly enhances productivity by providing the user with more relevant Bluetooth devices for possible communication. In an alternative embodiment, the selection facility may be integrated directly into any particular application.

Upon the user's selection of a target Bluetooth device 702, the connectivity tool's selection facility instructs the user's Bluetooth device 101 to send an inquiry message 703. This inquiry message is sent according to Bluetooth specifications.

Upon issuing the inquiry message 703, any Bluetooth devices within the range of the user's Bluetooth device will send back inquiry responses. The connectivity tool filters out all responses except inquiry responses received from the target Bluetooth device 704. Thus, only the desired target Bluetooth device is displayed on the user's Bluetooth device. This behavior greatly enhances user productivity by confirming the availability of a desired target device and not requiring the user to have to sift through other non-desired Bluetooth devices.

Upon receiving the inquiry response from the target device 704, the selection facility allows for the selection of the target Bluetooth device 705. Selection may be achieved through user input, automatic presets, default behavior, and/or the like as has already been discussed above. Thus, in one non-limiting example embodiment, the user may simply depress a keypad button to confirm that the target device is in fact the desired device. Alternatively, the selection tool may automatically confirm that the inquiry response from the target device is the desired device. One non-limiting example embodiment of automatic confirmation may be achieved by comparing information obtained from an inquiry response (e.g., the responding device's Bluetooth address, name, etc.) from the target device with information stored in the connectivity tool's Bluetooth directory database. Thus, in such an example, automatic confirmation occurs when a Bluetooth device's address, which is stored in a Bluetooth directory database, matches the Bluetooth address received in the inquiry response from the target Bluetooth device. Once the selection is made, whether it is by user or through automatic selection, then the connectivity tool pages the desired target device. Upon receiving a page response from the desired target device, then a Bluetooth communications connection is established according to Bluetooth specifications 705.

Connectivity Tool Device Page Selection Facility

Figure 8:
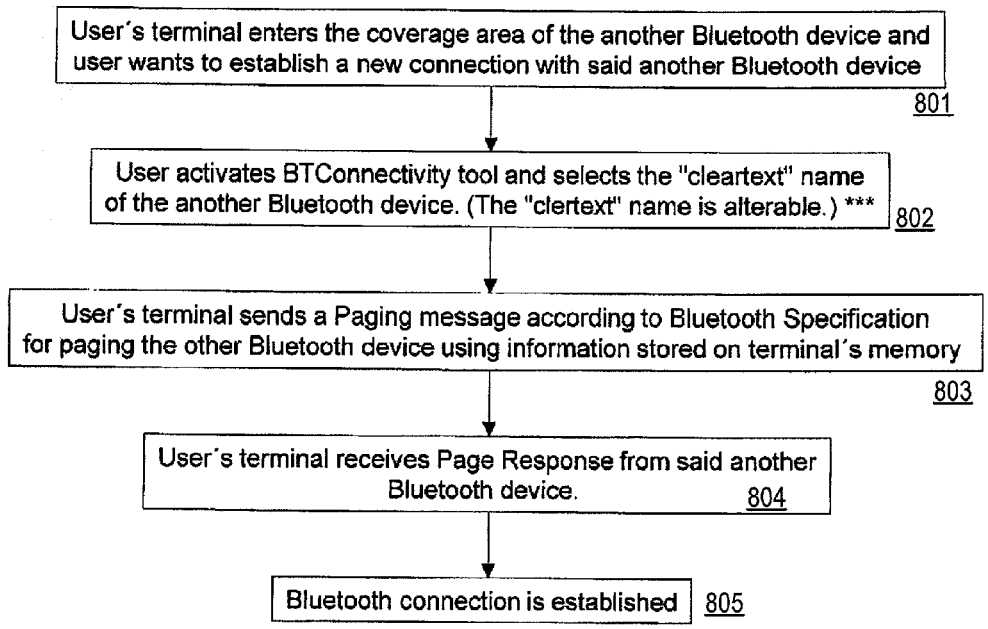
FIG. 8 illustrates a flowchart diagram of another non-limiting example embodiment of a connectivity tool device-selection-facility.

FIG. 8 illustrates a flowchart diagram of another non-limiting example embodiment of a connectivity tool device-selection-facility, i.e., selection facility. Similarly to the selection facility of FIG. 7, the selection facility may be engaged to establish a new communication connection with another Bluetooth device that is within range 801.

When in range 801, a client's 101 Bluetooth connectivity tool may be engaged, and in turn the selection facility may be provided to the user 802. In one non-limiting example embodiment, the connectivity tool may be engaged through a user input facility; for example, by depressing a key combination on a key pad like "##1". Alternatively, the connectivity tool may be engaged whenever new Bluetooth devices are detected within range. In one non-limiting example embodiment, the selection facility is automatically engaged upon activation of the Bluetooth connectivity tool. Upon activating the selection facility, a list is generated by retrieving entries of Bluetooth enabled devices found within the Bluetooth directory database. Such a list may be created by querying the Bluetooth directory database to select all unique Bluetooth identifiers 119a and return corresponding Bluetooth names 119b, wherein the Bluetooth names 119b are then fed to a user interface for user display by the selection facility. Upon generating the list of known Bluetooth enabled devices, the selection facility displays the list and allows a user to select entries corresponding to known Bluetooth devices by engaging the client's user interface.

In one non-limiting example embodiment, such a list comprises cleartext names, which represent other known Bluetooth devices and are associated with the Bluetooth addresses of the known devices. For example, a Nokia cell phone may have a Bluetooth clear-text name of "Jane Smith's Nokia cell phone," which is associated with the Nokia cell phone's Bluetooth address" as part of the Nokia phone's GOEP information. Such an association between known Bluetooth devices and their cleartext names may be maintained within the connectivity tool's Bluetooth directory database. In an alternative embodiment, a cleartext name is alterable by the user. Alteration may be achieved by providing and allowing a user to edit Bluetooth name 119b information in the Bluetooth directory database.

Upon displaying the list of known devices, the selection facility allows for the selection of the target Bluetooth device 802. In one non-limiting example embodiment, the user may navigate a cleartext selection list and select a desired target Bluetooth device by engaging the user input device, e.g., by depressing a scroll buttons on a keypad 109, which thereby allows for list traversal and selection of a desired device highlighting its cleartext representation. It should be noted that the selection facility may be accessed through an API; therefore, applications may make use of the selection facility through an API, which in turn engages the selection facility as a system resource. An API would allow any particular application to further narrow items for display via the selection facility. For example, if the selection facility were invoked via an application's printing API, instead of displaying a list of all known Bluetooth devices, then the API may instruct the selection facility to display only known Bluetooth printer devices. Such filtering functionality greatly enhances productivity by providing the user with more relevant Bluetooth devices for possible communication. In an alternative embodiment, the selection facility may be integrated directly into any particular application.

Upon the user's selection of a target Bluetooth device 802, the connectivity tool's selection facility instructs the user's Bluetooth device to send a paging message according to Bluetooth specifications 803 to the target device. The paging message is issued using information's stored on the user's Bluetooth device in a Bluetooth directory database. In one non-limiting example embodiment, upon the user's selection of a desired target device 802, the Bluetooth directory database is searched on the basis of the user's selection. For example, the user's selection of a cleartext name may be used to search the Bluetooth directory database for a Bluetooth address corresponding to the selected cleartext name(s). Upon retrieving a Bluetooth address corresponding to the user's selection, the retrieved address may be used to directly page the desired target device.

Upon sending a paging message to the desired target device 803, the user's Bluetooth device receives a page response from the desired target Bluetooth device 804. Upon receipt of and based upon the page response from the desired target device 804, a Bluetooth communication connection is established employing Bluetooth specification protocols 805.

The above embodiment allows the user's client to establish a connection with the desired target device using the Bluetooth address from the Bluetooth directory database without knowledge of clock offset information of the paged device. This is achievable because every Bluetooth device must enter a page-scan-mode every 2.56 seconds, and thus communication with the target device can be established without inquiry mode by culling information from a page-scan-mode. In one non-limiting example embodiment, authentication information may similarly be carried out automatically. The user may employ the selection facility to enable automatic authentication for specified devices, and such information will be provided along with the inquiry and/or page to the target device upon the user's selecting a desired target device in the selection facility.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

In addition, the disclosure herein includes other inventions not presently claimed. Applicant reserves all rights in those presently unclaimed inventions including the right to claim such inventions, file additional applications, continuations, continuations in part, divisions, and/or the like thereof.

What is claimed is:

1. A method of wireless communication between Bluetooth devices, comprising:
   receiving an initial signal;
   identifying information descriptive of a device that originated the received initial signal from the received initial signal, wherein the device descriptive information includes at least a Bluetooth address of the originating device;
   storing the device descriptive information in a database, wherein an association is maintained between the originating device's address and any other information relating to the originating device;
   invoking a selection list of known devices;
   retrieving known devices from the device descriptive database;
   providing the selection list of known devices, wherein items in the selection list of known devices may be selected, wherein the retrieved known devices are represented by cleartext names, wherein the list of known devices is populated with known devices retrieved from the device descriptive database;
   accepting a selection of a representation of a desired target device from the list;
   sending a signal to establish a communication connection with the desired target device, wherein the sent establishing signal may effect a response from the desired target device;
   receiving a response signal from a device responding to the sent establishing signal,
   wherein the Bluetooth address included in the device descriptive information is employed for future connection to the originating device via paging without conducting Bluetooth inquiry for detecting the originating device.

2. The method of claim 1, wherein the device descriptive database stores known device set identifiers.

3. The method of claim 2, wherein retrieval of known devices is achieved by accessing a known device set with a known device set identifier.

4. The method of claim 3, wherein the known device set is stored remotely.

5. The method of claim 3, wherein the retrieval of a known device set identifier provides access to a location specific known device set based upon a location from where retrieval takes place.

6. The method of claim 1, wherein initial signal reception is achieved by acquiring a page scan-mode signal.

7. The method of claim 1, wherein a field to store Bluetooth address information is added to a contact database.

8. The method of claim 7, wherein the added field is linked to the device descriptive database.

9. The method of claim 7, wherein the contact database is linked to the device descriptive database.

10. The method of claim 1, further comprising:
    accepting approval to allow the storage of the device descriptive information.

11. The method of claim 10, wherein the acceptance occurs upon termination of a communication connection between a device in receipt of the initial signal and the originating device.

12. The method of claim 10, wherein the approval is from a default setting.

13. The method of claim 10, wherein the approval is from a user.

14. The method of claim 1, wherein the invocation of the selection is from a user input.

15. The method of claim 1, wherein the invocation of the selection occurs automatically when receiving a signal from an unknown device.

16. The method of claim 1, wherein the population of the list of known devices is controlled by an application program interface.

17. The method of claim 1, wherein the population of the list of known devices is limited to devices relevant to a user's operational context.

18. The method of claim 1, wherein the selection of a desired target device is from a user.

19. The method of claim 1, wherein the selection of a desired target device is from a default setting.

20. The method of claim 1, wherein the sent establishing signal includes authentication information.

21. The method of claim 1, wherein the sent establishing signal is an inquiry message.

22. The method of claim 1, wherein the sent establishing signal is a page message.

23. The method of claim 1, wherein the sent establishing signal is targeted at the desired device.

24. The method of claim 1, further comprising:
    retrieving an address for the desired target device from the device descriptive database.

25. The method of claim 24, wherein a query based on the selection of the representation of the desired target device in the device descriptive database effects the retrieval of the address from the device descriptive database.

26. The method of claim 1, wherein the responding device is the desired target device.

27. The method of claim 1, further comprising:
sending a page message signal to effect a page-response message signal from the desired target device, if the received response signal is an inquiry response.

28. The method of claim 27, further comprising:
receiving a page-response message signal from the desired target device, if the received response signal is an inquiry response.

29. The method of claim 1, further comprising:
accepting a confirmation of the desired target device.

30. The method of claim 29, wherein the confirmation of a desired target device is from a user.

31. The method of claim 29, wherein the confirmation of a desired target device is from a default setting.

32. The method of claim 29, wherein responses from unselected devices responding to the sent establishment signal are not provided for confirmation.

33. A method of wireless communication between short-range radio-frequency communication devices, comprising:
receiving an initial signal;
identifying information descriptive of a device that originated the received initial signal, wherein the device descriptive information includes at least an address of the originating device;
storing the device descriptive information in a database, wherein an association is maintained between the originating device's address and other information relating to the originating device including at least a cleartext name of the originating device;
providing a list of known devices, wherein items of the list may be selected, wherein the list is populated with cleartext names of the known devices based on the device descriptive information stored in the database; and
sending, in response to selection of a desired target device from the list, a signal to establish a communication connection with the desired target device,
wherein the address included in the device descriptive information is employed for future connection to the originating device via paging without conducting inquiry for detecting the originating device.

34. The method of claim 33, wherein the device descriptive database stores known device set identifiers.

35. The method of claim 34, wherein retrieval of known devices is achieved by accessing a known device set with a known device set identifier.

36. The method of claim 35, wherein the known device set is stored remotely.

37. The method of claim 35, wherein the retrieval of a known device set identifier provides access to a location specific known device set based upon a location from where retrieval takes place.

38. The method of claim 33, wherein the address of the originating device is a unique address.

39. The method of claim 38, wherein the address of the originating device is a Bluetooth address.

40. The method of claim 33, wherein short-range radio-frequency communication devices are Bluetooth enabled.

41. The method of claim 33, wherein the device descriptive information is obtained from the received initial signal.

42. The method of claim 33, wherein initial signal reception is achieved by acquiring a page scan-mode signal.

43. The method of claim 33, wherein a field to store Bluetooth address information is added to a contact database.

44. The method of claim 43, wherein the added field is linked to the device descriptive database.

45. The method of claim 43, wherein the contact database is linked to the device descriptive database.

46. The method of claim 33, further comprising:
accepting approval to allow the storage of the device descriptive information.

47. The method of claim 46, wherein the acceptance occurs upon termination of a communication connection between a device in receipt of the initial signal and the originating device.

48. The method of claim 46, wherein the approval is from a default setting.

49. The method of claim 46, wherein the approval is from a user input.

50. A method of wireless communication between short-range radio-frequency communication devices, comprising:
invoking a selection list of known devices;
retrieving known devices from a device descriptive database;
providing the selection list of known devices, wherein items in the selection list of known devices may be selected, wherein the list of known devices is populated with known devices retrieved from the device descriptive database;
accepting a selection of a representation of a desired target device from the list;
sending a signal to establish a communication connection with the desired target device without inquiry, wherein the sent establishing signal may effect a response from the desired target device,
wherein the device descriptive database includes a previously-received address corresponding to the desired target device, and
wherein the previously-received address is employed for establishment of the communication connection with the desired target device via paging without conducting inquiry for detecting the desired target device.

51. The method of claim 50, wherein the device descriptive database stores known device set identifiers.

52. The method of claim 51, wherein retrieval of known devices is achieved by accessing a known device set with a known device set identifier.

53. The method of claim 52, wherein the known device set is stored remotely.

54. The method of claim 52, wherein the retrieval of a known device set identifier provides access to a location specific known device set based upon a location from where retrieval takes place.

55. The method of claim 50, wherein short-range radio-frequency communication is Bluetooth communication.

56. The method of claim 50, wherein a field to store Bluetooth address information is added to a contact database.

57. The method of claim 56, wherein the added field is linked to the device descriptive database.

58. The method of claim 56, wherein the contact database is linked to the device descriptive database.

59. The method of claim 50, wherein the invocation of the selection is from a user input.

60. The method of claim 50, wherein the invocation of the selection occurs automatically when receiving a signal from an unknown device.

61. The method of claim 50, wherein the retrieved known devices are represented by cleartext names.

62. The method of claim 50, wherein the population of the list of known devices is controlled by an application program interface.

63. The method of claim 50, wherein the population of the list of known devices is limited to devices relevant to a user's operational context.

64. The method of claim 50, wherein the selection of a desired target device is from a user.

65. The method of claim 50, wherein the selection of a desired target device is from a default setting.

66. The method of claim 50, wherein the sent establishing signal includes authentication information.

67. The method of claim 50, wherein the sent establishing signal is an inquiry message.

68. The method of claim 50, wherein the sent establishing signal is a page message.

69. The method of claim 50, wherein the sent establishing signal is targeted at the desired device.

70. The method of claim 50, further comprising:
retrieving an address for the desired target device from the device descriptive database.

71. The method of claim 70, wherein a query based on the selection of the representation of the desired target device in the device descriptive database effects the retrieval of the address from the device descriptive database.

72. The method of claim 50, further comprising:
receiving a response signal from a device responding to the sent establishing signal.

73. The method of claim 72, wherein the responding device is the desired target device.

74. The method of claim 72, further comprising:
sending a page message signal to effect a page-response message signal from the desired target device, if the received response signal is an inquiry response.

75. The method of claim 74, further comprising:
receiving a page-response message signal from the desired target device, if the received response signal is an inquiry response.

76. The method of claim 50, further comprising:
accepting a confirmation of the desired target device.

77. The method of claim 76, wherein the confirmation of a desired target device is from a user.

78. The method of claim 76, wherein the confirmation of a desired target device is from a default setting.

79. A system for wireless communication between Bluetooth devices, comprising:
means to receive an initial signal;
means to identify information descriptive of a device that originated the received initial signal from the received initial signal, wherein the device descriptive information includes at least a Bluetooth address of the originating device;
means to store the device descriptive information in a database, wherein an association is maintained between the originating device's address and any other information relating to the originating device;
means to invoke a selection list of known devices;
means to retrieve known devices from the device descriptive database;
means to provide the selection list of known devices, wherein items in the selection list of known devices may be selected, wherein the retrieved known devices are represented by cleartext names, wherein the list of known devices is populated with known devices retrieved from the device descriptive database;
means to accept a selection of a representation of a desired target device from the list;
means to send a signal to establish a communication connection with the desired target device, wherein the sent establishing signal may effect a response from the desired target device;
means to receive a response signal from a device responding to the sent establishing signal,
wherein the Bluetooth address included in the device descriptive information is employed for future connection to the originating device via paging without conducting Bluetooth inquiry for detecting the originating device.

80. The system of claim 79, wherein the device descriptive database stores known device set identifiers.

81. The system of claim 80, wherein retrieval of known devices is achieved by accessing a known device set with a known device set identifier.

82. The system of claim 81, wherein the known device set is stored remotely.

83. The system of claim 81, wherein the retrieval of a known device set identifier provides access to a location specific known device set based upon a location from where retrieval takes place.

84. The system of claim 79, wherein initial signal reception is achieved by acquiring a page scan-mode signal.

85. The system of claim 79, wherein a field to store Bluetooth address information is added to a contact database.

86. The system of claim 85, wherein the added field is linked to the device descriptive database.

87. The system of claim 85, wherein the contact database is linked to the device descriptive database.

88. The system of claim 79, further comprising:
means to accept approval to allow the storage of the device descriptive information.

89. The system of claim 88, wherein the acceptance occurs upon termination of a communication connection between a device in receipt of the initial signal and the originating device.

90. The system of claim 88, wherein the approval is from a default setting.

91. The system of claim 88, wherein the approval is from a user.

92. The system of claim 79, wherein the invocation of the selection is from a user input.

93. The system of claim 79, wherein the invocation of the selection occurs automatically when receiving a signal from an unknown device.

94. The system of claim 79, wherein the population of the list of known devices is controlled by an application program interface.

95. The system of claim 79, wherein the population of the list of known devices is limited to devices relevant to a user's operational context.

96. The system of claim 79, wherein the selection of a desired target device is from a user.

97. The system of claim 79, wherein the selection of a desired target device is from a default setting.

98. The system of claim 79, wherein the sent establishing signal includes authentication information.

99. The system of claim 79, wherein the sent establishing signal is an inquiry message.

100. The system of claim 79, wherein the sent establishing signal is a page message.

101. The system of claim 79, wherein the sent establishing signal is targeted at the desired device.

102. The system of claim 79, further comprising:
means to retrieve an address for the desired target device from the device descriptive database.

103. The system of claim 102, wherein a query based on the selection of the representation of the desired target device in the device descriptive database effects the retrieval of the address from the device descriptive database.

104. The system of claim 79, wherein the responding device is the desired target device.

105. The system of claim 79, further comprising:
means to send a page message signal to effect a page-response message signal from the desired target device, if the received response signal is an inquiry response.

106. The system of claim 105, further comprising:
means to receive a page-response message signal from the desired target device, if the received response signal is an inquiry response.

107. The system of claim 79, further comprising:
accepting a confirmation of the desired target device.

108. The system of claim 107, wherein the confirmation of a desired target device is from a user.

109. The system of claim 107, wherein the confirmation of a desired target device is from a default setting.

110. The system of claim 107, wherein responses from unselected devices responding to the sent establishment signal are not provided for confirmation.

111. A system for wireless communication between short-range radio-frequency devices, comprising:
means to receive an initial signal;
means to identify information descriptive of a device that originated the received initial signal, wherein the device descriptive information includes at least an address of the originating device;
means to store the device descriptive information in a database, wherein an association is maintained between the originating device's address and other information relating to the originating device including at least a cleartext name of the originating device;
means to provide a list of known devices, wherein items of the list may be selected, wherein the list is populated with cleartext names of the known devices based on the device descriptive information stored in the database; and
means to send, in response to selection of a desired target device from the list, a signal to establish a communication connection with the desired target device,
wherein the address included in the device descriptive information is employed for future connection to the originating device via paging without conducting inquiry for detecting the originating device.

112. The system of claim 111, wherein short-range radio-frequency devices are Bluetooth enabled.

113. The system of claim 111, wherein the address of the originating device is a unique address.

114. The system of claim 113, wherein the address of the originating device is a Bluetooth address.

115. The system of claim 111, wherein the device descriptive database stores known device set identifiers.

116. The system of claim 115, wherein retrieval of known devices is achieved by accessing a known device set with a known device set identifier.

117. The system of claim 116, wherein the known device set is stored remotely.

118. The system of claim 116, wherein the retrieval of a known device set identifier provides access to a location specific known device set based upon a location from where retrieval takes place.

119. The system of claim 111, wherein the device descriptive information is obtained from the received initial signal.

120. The system of claim 111, wherein initial signal reception is achieved by acquiring a page scan-mode signal.

121. The system of claim 111, wherein a field to store Bluetooth address information is added to a contact database.

122. The system of claim 121, wherein the added field is linked to the device descriptive database.

123. The system of claim 121, wherein the contact database is linked to the device descriptive database.

124. The system of claim 111, further comprising:
means to accept approval to allow the storage of the device descriptive information.

125. The system of claim 124, wherein the acceptance occurs upon termination of a communication connection between a device in receipt of the initial signal and the originating device.

126. The system of claim 124, wherein the approval is from a default setting.

127. The system of claim 124, wherein the approval is from a user input.

128. A system for wireless communication between short-range radio frequency devices, comprising:
means to invoke a selection list of known devices;
means to retrieve known devices from a device descriptive database;
means to provide the selection list of known devices, wherein items in the selection list of known devices may be selected, wherein the list of known devices is populated with known devices retrieved from the device descriptive database;
means to accept a selection of a representation of a desired target device from the list;
means to send a signal to establish a communication connection with the desired target device without inquiry, wherein the sent establishing signal may effect a response from the desired target device,
wherein the device descriptive database includes a previously-received address corresponding to the desired target device, and
wherein the previously-received address is employed for establishment of the communication connection with the desired target device via paging without conducting inquiry for detecting the desired target device.

129. The system of claim 128, wherein short-range radio-frequency devices are Bluetooth enabled.

130. The system of claim 128, wherein the device descriptive database stores known device set identifiers.

131. The system of claim 130, wherein retrieval of known devices is achieved by accessing a known device set with a known device set identifier.

132. The system of claim 131, wherein the known device set is stored remotely.

133. The system of claim 131, wherein the retrieval of a known device set identifier provides access to a location specific known device set based upon a location from where retrieval takes place.

134. The system of claim 128, wherein a field to store Bluetooth address information is added to a contact database.

135. The system of claim 134, wherein the added field is linked to the device descriptive database.

136. The system of claim 134, wherein the contact database is linked to the device descriptive database.

137. The system of claim 128, wherein the invocation of the selection is from a user input.

138. The system of claim 128, wherein the invocation of the selection occurs automatically when receiving a signal from an unknown device.

139. The system of claim 128, wherein the retrieved known devices are represented by cleartext names.

140. The system of claim 128, wherein the population of the list of known devices is controlled by an application program interface.

141. The system of claim 128, wherein the population of the list of known devices is limited to devices relevant to a user's operational context.

142. The system of claim 128, wherein the selection of a desired target device is from a user.

143. The system of claim 128, wherein the selection of a desired target device is from a default setting.

144. The system of claim 128, wherein the sent establishing signal includes authentication information.

145. The system of claim 128, wherein the sent establishing signal is an inquiry message.

146. The system of claim 128, wherein the sent establishing signal is a page message.

147. The system of claim 128, wherein the sent establishing signal is targeted at the desired device.

148. The system of claim 128, further comprising:
means to retrieve an address for the desired target device from the device descriptive database.

149. The system of claim 148, wherein a query based on the selection of the representation of the desired target device in the device descriptive database effects the retrieval of the address from the device descriptive database.

150. The system of claim 128, further comprising:
means to receive a response signal from a device responding to the sent establishing signal.

151. The system of claim 150, wherein the responding device is the desired target device.

152. The system of claim 150, further comprising:
means to send a page message signal to effect a page-response message signal from the desired target device, if the received response signal is an inquiry response.

153. The system of claim 152, further comprising:
means to receive a page-response message signal from the desired target device, if the received response signal is an inquiry response.

154. The system of claim 128, further comprising:
means to accept a confirmation of the desired target device.

155. The system of claim 154, wherein the confirmation of a desired target device is from a user.

156. The system of claim 154, wherein the confirmation of a desired target device is from a default setting.

157. A medium readable by a processor for wireless communication between Bluetooth devices, comprising:
instruction signals stored in the processor readable medium, wherein the instruction signals are issuable by the processor to:
receive an initial signal;
identify information descriptive of a device that originated the received initial signal from the received initial signal, wherein the device descriptive information includes at least a Bluetooth address of the originating device;
store the device descriptive information in a database, wherein an association is maintained between the originating device's address and any other information relating to the originating device;
invoke a selection list of known devices;
retrieve known devices from the device descriptive database;
provide the selection list of known devices, wherein items in the selection list of known devices may be selected, wherein the retrieved known devices are represented by cleartext names, wherein the list of known devices is populated with known devices retrieved from the device descriptive database;
accept a selection of a representation of a desired target device from the list;
send a signal to establish a communication connection with the desired target device, wherein the sent establishing signal may effect a response from the desired target device;
receive a response signal from a device responding to the sent establishing signal,
wherein the Bluetooth address included in the device descriptive information is employed for future connection to the originating device via paging without conducting Bluetooth inquiry for detecting the originating device.

158. The medium of claim 157, wherein the device descriptive database stores known device set identifiers.

159. The medium of claim 158, wherein retrieval of known devices is achieved by accessing a known device set with a known device set identifier.

160. The medium of claim 159, wherein the known device set is stored remotely.

161. The medium of claim 159, wherein the retrieval of a known device set identifier provides access to a location specific known device set based upon a location from where retrieval takes place.

162. The medium of claim 157, wherein initial signal reception is achieved by acquiring a page scan-mode signal.

163. The medium of claim 157, wherein a field to store Bluetooth address information is added to a contact database.

164. The medium of claim 163, wherein the added field is linked to the device descriptive database.

165. The medium of claim 163, wherein the contact database is linked to the device descriptive database.

166. The medium of claim 157, further comprising:
processor issuable instruction signals to accept approval to allow the storage of the device descriptive information.

167. The medium of claim 166, wherein the acceptance occurs upon termination of a communication connection between a device in receipt of the initial signal and the originating device.

168. The medium of claim 166, wherein the approval is from a default setting.

169. The medium of claim 166, wherein the approval is from a user.

170. The medium of claim 157, wherein the invocation of the selection is from a user input.

171. The medium of claim 157, wherein the invocation of the selection occurs automatically when receiving a signal from an unknown device.

172. The medium of claim 157, wherein the population of the list of known devices is controlled by an application program interface.

173. The medium of claim 157, wherein the population of the list of known devices is limited to devices relevant to a user's operational context.

174. The medium of claim 157, wherein the selection of a desired target device is from a user.

175. The medium of claim 157, wherein the selection of a desired target device is from a default setting.

176. The medium of claim 157, wherein the sent establishing signal includes authentication information.

177. The medium of claim 157, wherein the sent establishing signal is an inquiry message.

178. The medium of claim 157, wherein the sent establishing signal is a page message.

179. The medium of claim 157, wherein the sent establishing signal is targeted at the desired device.

180. The medium of claim 157, further comprising:
processor issuable instruction signals to retrieve an address for the desired target device from the device descriptive database.

181. The medium of claim 180, wherein a query based on the selection of the representation of the desired target device in the device descriptive database effects the retrieval of the address from the device descriptive database.

182. The medium of claim 157, wherein the responding device is the desired target device.

183. The medium of claim 157, further comprising:
processor issuable instruction signals to send a page message signal to effect a page-response message signal from the desired target device, if the received response signal is an inquiry response.

184. The medium of claim 183, further comprising:
processor issuable instruction signals to receive a page-response message signal from the desired target device, if the received response signal is an inquiry response.

185. The medium of claim 157, further comprising:
accepting a confirmation of the desired target device.

186. The medium of claim 185, wherein the confirmation of a desired target device is from a user.

187. The medium of claim 185, wherein the confirmation of a desired target device is from a default setting.

188. The medium of claim 185, wherein responses from unselected devices responding to the sent establishment signal are not provided for confirmation.

189. A medium readable by a processor for wireless communication between short-range radio-frequency communication devices, comprising:
instruction signals stored in the processor readable medium, wherein the instruction signals are issuable by the processor to:
receive an initial signal;
identify information descriptive of a device that originated the received initial signal, wherein the device descriptive information includes at least an address of the originating device;
store the device descriptive information in a database, wherein an association is maintained between the originating device's address and other information relating to the originating device including at least a cleartext name of the originating device;
provide a list of known devices, wherein items of the list may be selected, wherein the list is populated with cleartext names of the known devices based on the device descriptive information stored in the database; and
send, in response to selection of a desired target device from the list, a signal to establish a communication connection with the desired target device,
wherein the address included in the device descriptive information is employed for future connection to the originating device via paging without conducting inquiry for detecting the originating device.

190. The medium of claim 189, wherein short-range radio-frequency communication devices are Bluetooth enabled.

191. The medium of claim 189, wherein the address of the originating device is a unique address.

192. The medium of claim 191, wherein the address of the originating device is a Bluetooth address.

193. The medium of claim 189, wherein the device descriptive database stores known device set identifiers.

194. The medium of claim 193, wherein retrieval of known devices is achieved by accessing a known device set with a known device set identifier.

195. The medium of claim 194, wherein the known device set is stored remotely.

196. The medium of claim 194, wherein the retrieval of a known device set identifier provides access to a location specific known device set based upon a location from where retrieval takes place.

197. The medium of claim 189, wherein short-range radio-frequency communication is Bluetooth communication.

198. The medium of claim 189, wherein the device descriptive information is obtained from the received initial signal.

199. The medium of claim 189, wherein initial signal reception is achieved by acquiring a page scan-mode signal.

200. The medium of claim 189, wherein a field to store Bluetooth address information is added to a contact database.

201. The medium of claim 200, wherein the added field is linked to the device descriptive database.

202. The medium of claim 200, wherein the contact database is linked to the device descriptive database.

203. The medium of claim 189, further comprising:
processor issuable instruction signals to accept approval to allow the storage of the device descriptive information.

204. The medium of claim 203, wherein the acceptance occurs upon termination of a communication connection between a device in receipt of the initial signal and the originating device.

205. The medium of claim 203, wherein the approval is from a default setting.

206. The medium of claim 203, wherein the approval is from a user input.

207. A medium readable by a processor for wireless communication between short-range radio-frequency communication devices, comprising:
instruction signals stored in the processor readable medium, wherein the instruction signals are issuable by the processor to:
invoke a selection list of known devices;
retrieve known devices from a device descriptive database;
provide the selection list of known devices, wherein items in the selection list of known devices may be selected, wherein the list of known devices is populated with known devices retrieved from the device descriptive database;
accept a selection of a representation of a desired target device from the list;
send a signal to establish a communication connection with the desired target device without inquiry, wherein the sent establishing signal may effect a response from the desired target device, wherein the device descriptive database includes a previously-received address corresponding to the desired target device, and wherein the previously-received address is employed for establishment of the communication connection with the desired target device via paging without conducting inquiry for detecting the desired target device.

208. The medium of claim 207, wherein the device descriptive database stores known device set identifiers.

209. The medium of claim 208, wherein retrieval of known devices is achieved by accessing a known device set with a known device set identifier.

210. The medium of claim 209, wherein the known device set is stored remotely.

211. The medium of claim 209, wherein the retrieval of a known device set identifier provides access to a location specific known device set based upon a location from where retrieval takes place.

212. The medium of claim 207, wherein short-range radio-frequency communication is Bluetooth communication.

213. The medium of claim 207, wherein a field to store Bluetooth address information is added to a contact database.

214. The medium of claim 213, wherein the added field is linked to the device descriptive database.

215. The medium of claim 213, wherein the contact database is linked to the device descriptive database.

216. The medium of claim 207, wherein the invocation of the selection is from a user input.

217. The medium of claim 207, wherein the invocation of the selection occurs automatically when receiving a signal from an unknown device.

218. The medium of claim 207, wherein the retrieved known devices are represented by cleartext names.

219. The medium of claim 207, wherein the population of the list of known devices is controlled by an application program interface.

220. The medium of claim 207, wherein the population of the list of known devices is limited to devices relevant to a user's operational context.

221. The medium of claim 207, wherein the selection of a desired target device is from a user.

222. The medium of claim 207, wherein the selection of a desired target device is from a default setting.

223. The medium of claim 207, wherein the sent establishing signal includes authentication information.

224. The medium of claim 207, wherein the sent establishing signal is an inquiry message.

225. The medium of claim 207, wherein the sent establishing signal is a page message.

226. The medium of claim 207, wherein the sent establishing signal is targeted at the desired device.

227. The medium of claim 207, further comprising:
processor issuable instruction signals to retrieve an address for the desired target device from the device descriptive database.

228. The medium of claim 227, wherein a query based on the selection of the representation of the desired target device in the device descriptive database effects the retrieval of the address from the device descriptive database.

229. The medium of claim 207, further comprising:
processor issuable instruction signals to receive a response signal from a device responding to the sent establishing signal.

230. The medium of claim 229, wherein the responding device is the desired target device.

231. The medium of claim 229, further comprising:
processor issuable instruction signals to send a page message signal to effect a page-response message signal from the desired target device, if the received response signal is an inquiry response.

232. The medium of claim 231, further comprising:
processor issuable instruction signals to receive a page-response message signal from the desired target device, if the received response signal is an inquiry response.

233. The medium of claim 207, further comprising:
processor issuable instruction signals to accept a confirmation of the desired target device.

234. The medium of claim 233, wherein the confirmation of a desired target device is from a user.

235. The medium of claim 233, wherein the confirmation of a desired target device is from a default setting.

236. An apparatus for wireless communication between Bluetooth devices, comprising:
a memory, the memory for storing instructions;
a processor that may issue a plurality of processing instructions stored in the memory, wherein the instructions issue signals to:
receive an initial signal;
identify information descriptive of a device that originated the received initial signal from the received initial signal, wherein the device descriptive information includes at least a Bluetooth address of the originating device;
store the device descriptive information in a database, wherein an association is maintained between the originating device's address and any other information relating to the originating device;
invoke a selection list of known devices;
retrieve known devices from the device descriptive database, wherein the retrieved known devices are represented by cleartext names;
provide the selection list of known devices, wherein items in the selection list of known devices may be selected, wherein the list of known devices is populated with known devices retrieved from the device descriptive database;
accept a selection of a representation of a desired target device from the list;
send a signal to establish a communication connection with the desired target device, wherein the sent establishing signal may effect a response from the desired target device;
receive a response signal from a device responding to the sent establishing signal,
wherein the Bluetooth address included in the device descriptive information is employed for future connection to the originating device via paging without conducting Bluetooth inquiry for detecting the originating device.

237. The apparatus of claim 236, wherein the device descriptive database stores known device set identifiers.

238. The apparatus of claim 237, wherein retrieval of known devices is achieved by accessing a known device set with a known device set identifier.

239. The method of claim 238, wherein the known device set is stored remotely.

240. The apparatus of claim 238, wherein the retrieval of a known device set identifier provides access to a location specific known device set based upon a location from where retrieval takes place.

241. The apparatus of claim 236, wherein initial signal reception is achieved by acquiring a page scan-mode signal.

242. The apparatus of claim 236, wherein a field to store Bluetooth address information is added to a contact database.

243. The apparatus of claim 242, wherein the added field is linked to the device descriptive database.

244. The apparatus of claim 242, wherein the contact database is linked to the device descriptive database.

245. The apparatus of claim 236, further comprising:
processor issuable instruction signals to accept approval to allow the storage of the device descriptive information.

246. The apparatus of claim 245, wherein the acceptance occurs upon termination of a communication connection between a device in receipt of the initial signal and the originating device.

247. The apparatus of claim 245, wherein the approval is from a default setting.

248. The apparatus of claim 245, wherein the approval is from a user.

249. The apparatus of claim 236, wherein the invocation of the selection is from a user input.

250. The apparatus of claim 236, wherein the invocation of the selection occurs automatically when receiving a signal from an unknown device.

251. The apparatus of claim 236, wherein the population of the list of known devices is controlled by an application program interface.

252. The apparatus of claim 236, wherein the population of the list of known devices is limited to devices relevant to a user's operational context.

253. The apparatus of claim 236, wherein the selection of a desired target device is from a user.

254. The apparatus of claim 236, wherein the selection of a desired target device is from a default setting.

255. The apparatus of claim 236, wherein the sent establishing signal includes authentication information.

256. The apparatus of claim 236, wherein the sent establishing signal is an inquiry message.

257. The apparatus of claim 236, wherein the sent establishing signal is a page message.

258. The apparatus of claim 236, wherein the sent establishing signal is targeted at the desired device.

259. The apparatus of claim 236, further comprising:
processor issuable instruction signals to retrieve an address for the desired target device from the device descriptive database.

260. The apparatus of claim 259, wherein a query based on the selection of the representation of the desired target device in the device descriptive database effects the retrieval of the address from the device descriptive database.

261. The apparatus of claim 236, wherein the responding device is the desired target device.

262. The apparatus of claim 236, further comprising:
processor issuable instruction signals to send a page message signal to effect a page-response message signal from the desired target device, if the received response signal is an inquiry response.

263. The apparatus of claim 262, further comprising:
processor issuable instruction signals to receive a page-response message signal from the desired target device, if the received response signal is an inquiry response.

264. The apparatus of claim 236, further comprising:
accepting a confirmation of the desired target device.

265. The apparatus of claim 264, wherein the confirmation of a desired target device is from a user.

266. The apparatus of claim 264, wherein the confirmation of a desired target device is from a default setting.

267. The apparatus of claim 264, wherein responses from unselected devices responding to the sent establishment signal are not provided for confirmation.

268. An apparatus for wireless communication between short-range radio-frequency communication devices, comprising:
a memory, the memory for storing instructions;
a processor that may issue a plurality of processing instructions stored in the memory, wherein the instructions issue signals to:
receive an initial signal;
identify information descriptive of a device that originated the received initial signal, wherein the device descriptive information includes at least an address of the originating device;
store the device descriptive information in a database, wherein an association is maintained between the originating device's address and other information relating to the originating device including at least a cleartext name of the originating device;
provide a list of known devices, wherein items of the list may be selected, wherein the list is populated with cleartext names of the known devices based on the device descriptive information stored in the database; and
send, in response to selection of a desired target device from the list, a signal to establish a communication connection with the desired target device,
wherein the address included in the device descriptive information is employed for future connection to the originating device via paging without conducting inquiry for detecting the originating device.

269. The apparatus of claim 268, wherein short-range radio-frequency communication devices are Bluetooth enabled.

270. The apparatus of claim 268, wherein the address of the originating device is a unique address.

271. The apparatus of claim 270, wherein the address of the originating device is a Bluetooth address.

272. The apparatus of claim 268, wherein the device descriptive database stores known device set identifiers.

273. The apparatus of claim 272, wherein retrieval of known devices is achieved by accessing a known device set with a known device set identifier.

274. The apparatus of claim 273, wherein the known device set is stored remotely.

275. The apparatus of claim 273, wherein the retrieval of a known device set identifier provides access to a location specific known device set based upon a location from where retrieval takes place.

276. The apparatus of claim 268, wherein short-range radio-frequency communication is Bluetooth communication.

277. The apparatus of claim 268, wherein the device descriptive information is obtained from the received initial signal.

278. The apparatus of claim 268, wherein initial signal reception is achieved by acquiring a page scan-mode signal.

279. The apparatus of claim 268, wherein a field to store Bluetooth address information is added to a contact database.

280. The apparatus of claim 279, wherein the added field is linked to the device descriptive database.

281. The apparatus of claim 279, wherein the contact database is linked to the device descriptive database.

282. The apparatus of claim 268, further comprising:
processor issuable instruction signals to accept approval to allow the storage of the device descriptive information.

283. The apparatus of claim 282, wherein the acceptance occurs upon termination of a communication connection between a device in receipt of the initial signal and the originating device.

284. The apparatus of claim 282, wherein the approval is from a default setting.

285. The apparatus of claim 282, wherein the approval is from a user input.

286. An apparatus for wireless communication between short-range radio-frequency communication devices, comprising:
a memory, the memory for storing instructions;
a processor that may issue a plurality of processing instructions stored in the memory, wherein the instructions issue signals to:
invoke a selection list of known devices;
retrieve known devices from a device descriptive database;
provide the selection list of known devices, wherein items in the selection list of known devices may be selected, wherein the list of known devices is populated with known devices retrieved from the device descriptive database;
accept a selection of a representation of a desired target device from the list;
send a signal to establish a communication connection with the desired target device without inquiry, wherein the sent establishing signal may effect a response from the desired target device,
wherein the device descriptive database includes a previously-received address corresponding to the desired target device, and
wherein the previously-received address is employed for establishment of the communication connection with the desired target device via paging without conducting inquiry for detecting the desired target device.

287. The apparatus of claim 286, wherein the device descriptive database stores known device set identifiers.

288. The apparatus of claim 287, wherein retrieval of known devices is achieved by accessing a known device set with a known device set identifier.

289. The apparatus of claim 288, wherein the known device set is stored remotely.

290. The apparatus of claim 288, wherein the retrieval of a known device set identifier provides access to a location specific known device set based upon a location from where retrieval takes place.

291. The apparatus of claim 286, wherein short-range radio-frequency communication is Bluetooth communication.

292. The apparatus of claim 286, wherein a field to store Bluetooth address information is added to a contact database.

293. The apparatus of claim 292, wherein the added field is linked to the device descriptive database.

294. The apparatus of claim 292, wherein the contact database is linked to the device descriptive database.

295. The apparatus of claim 286, wherein the invocation of the selection is from a user input.

296. The apparatus of claim 286, wherein the invocation of the selection occurs automatically when receiving a signal from an unknown device.

297. The apparatus of claim 286, wherein the retrieved known devices are represented by cleartext names.

298. The apparatus of claim 286, wherein the population of the list of known devices is controlled by an application program interface.

299. The apparatus of claim 286, wherein the population of the list of known devices is limited to devices relevant to a user's operational context.

300. The apparatus of claim 286, wherein the selection of a desired target device is from a user.

301. The apparatus of claim 286, wherein the selection of a desired target device is from a default setting.

302. The apparatus of claim 286, wherein the sent establishing signal includes authentication information.

303. The apparatus of claim 286, wherein the sent establishing signal is an inquiry message.

304. The apparatus of claim 286, wherein the sent establishing signal is a page message.

305. The apparatus of claim 286, wherein the sent establishing signal is targeted at the desired device.

306. The apparatus of claim 286, further comprising:
processor issuable instruction signals to retrieve an address for the desired target device from the device descriptive database.

307. The apparatus of claim 306, wherein a query based on the selection of the representation of the desired target device in the device descriptive database effects the retrieval of the address from the device descriptive database.

308. The apparatus of claim 286, further comprising:
processor issuable instruction signals to receive a response signal from a device responding to the sent establishing signal.

309. The apparatus of claim 308, wherein the responding device is the desired target device.

310. The apparatus of claim 308, further comprising:
processor issuable instruction signals to send a page message signal to effect a page-response message signal from the desired target device, if the received response signal is an inquiry response.

311. The apparatus of claim 310, further comprising:
processor issuable instruction signals to receive a page-response message signal from the desired target device, if the received response signal is an inquiry response.

312. The apparatus of claim 286, further comprising:
processor issuable instruction signals to accept a confirmation of the desired target device.

313. The apparatus of claim 312, wherein the confirmation of a desired target device is from a user.

314. The apparatus of claim 312, wherein the confirmation of a desired target device is from a default setting.

315. The method of claim 1, wherein inquiry responses not received from the desired target device are ignored.

316. The method of claim 1, wherein the communication connection is established via paging without inquiry.

317. The method of claim 50, wherein inquiry responses not received from the desired target device are ignored.

318. The method of claim 50, wherein the communication connection is established via paging without inquiry.

319. The system of claim 79, wherein inquiry responses not received from the desired target device are ignored.

320. The system of claim 79, wherein the communication connection is established via paging without inquiry.

321. The system of claim 128, wherein inquiry responses not received from the desired target device are ignored.

322. The system of claim 128, wherein the communication connection is established via paging without inquiry.

323. The medium of claim 157, wherein inquiry responses not received from the desired target device are ignored.

324. The medium of claim 157, wherein the communication connection is established via paging without inquiry.

325. The medium of claim 207, wherein inquiry responses not received from the desired target device are ignored.

326. The medium of claim 207, wherein the communication connection is established via paging without inquiry.

327. The apparatus of claim 236, wherein inquiry responses not received from the desired target device are ignored.

328. The apparatus of claim 236, wherein the communication connection is established via paging without inquiry.

329. The apparatus of claim 286, wherein inquiry responses not received from the desired target device are ignored.

330. The apparatus of claim 286, wherein the communication connection is established via paging without inquiry.

* * * * *